Oct. 13, 1936.  F. H. GULLIKSEN  2,057,520
REGULATING SYSTEM
Filed June 15, 1935   2 Sheets-Sheet 1
Fig. 1.
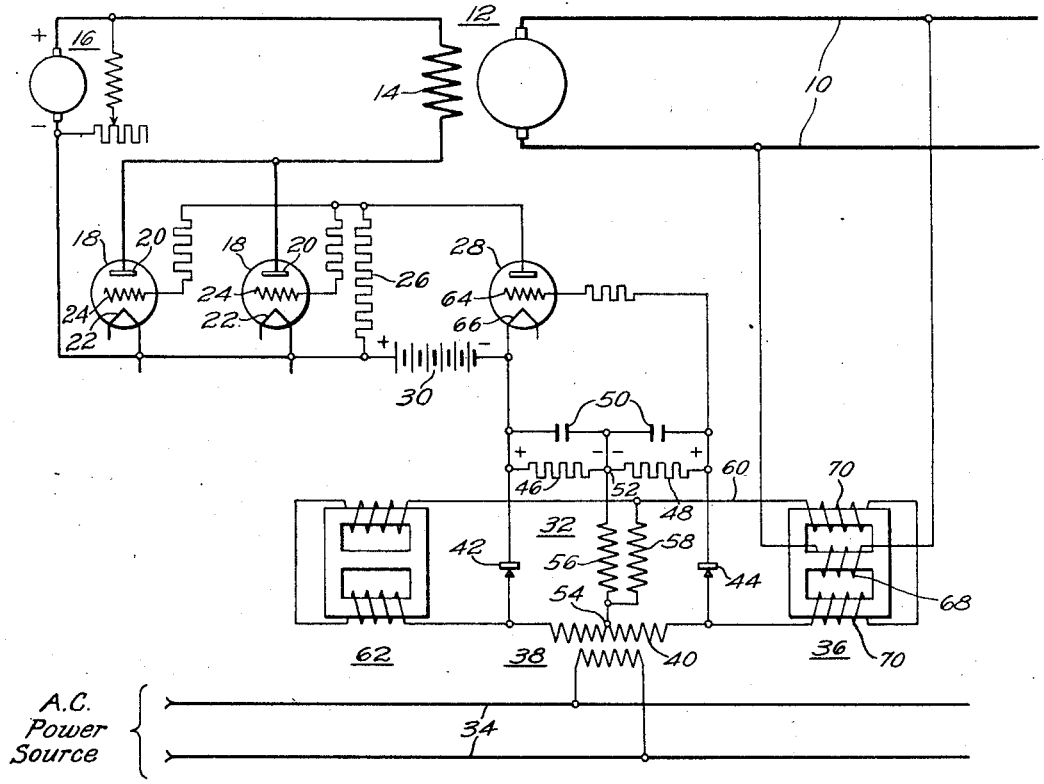
Fig. 2.
Fig. 3.
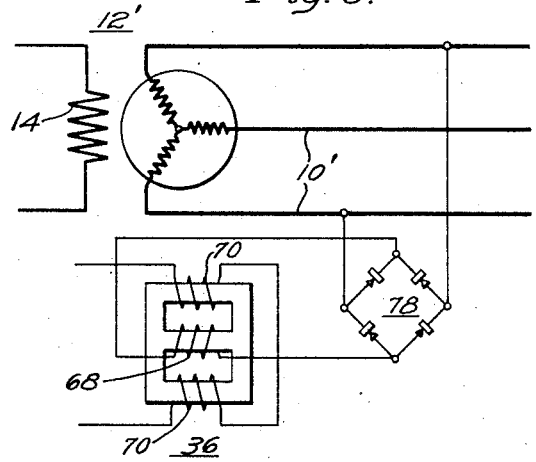
WITNESSES:
C. J. Weller
Wm. C. Groome
INVENTOR
Finn H. Gulliksen.
BY Ezra W. Savage
ATTORNEY Oct. 13, 1936.　　　　F. H. GULLIKSEN　　　　2,057,520
REGULATING SYSTEM
Filed June 15, 1935　　　2 Sheets-Sheet 2

WITNESSES:　　　　　　　　　　　　　　　　INVENTOR
　　　　　　　　　　　　　　　　　　　　　Finn H. Gulliksen.
　　　　　　　　　　　　　　　　　　　　　BY
　　　　　　　　　　　　　　　　　　　　　ATTORNEY Patented Oct. 13, 1936

2,057,520

UNITED STATES PATENT OFFICE 2,057,520

REGULATING SYSTEM

Finn H. Gulliksen, Wilkinsburg, Pa., assignor to Westinghouse Electric & Manufacturing Company, East Pittsburgh, Pa., a corporation of Pennsylvania Application June 15, 1935, Serial No. 26,886

3 Claims. (Cl. 171—119)

My invention relates to regulating systems and it has particular relation to electronic tube systems capable of maintaining constant the voltage or other characteristic of a direct current or other electrical circuit.

One object of my invention is to simplify the construction, improve the reliability and lower the cost of systems of this character.

A more specific object is to provide improved means for converting changes in a measure of a regulated quantity into magnitude and polarity variations in a direct-current potential which may be utilized to control the quantity adjusting electronic tube.

Another object is to provide error-detecting means capable of high sensitivity without the use of the source of standard or reference control potential heretofore required in high sensitivity applications.

A further object is to provide detecting means of the above class which are especially, though not exclusively, suited for use with direct-current circuits, the voltage or other characteristic of which is to be regulated.

A still further object is to so arrange the above-described detecting means that differences in the voltage, current or other rating of the regulated circuit do not affect their performance.

An additional object is to provide error-detecting means which, in addition to the above particularized features, are further characterized by high amplifying characteristics.

In practicing my invention, I interpose between the quantity adjusting electronic tube and the regulated circuit an alternating-current energized rectifier bridge circuit, the controlling element of which is in the form of a saturable core reactor which I arrange to be influenced by a measure of the regulated quantity. Quantity changes thus converted into variations in the reactance of the reactor appear, in turn, as magnitude and polarity variations in the direct-current output voltage of the bridge circuit which control the quantity-adjusting electronic tube. Such a combination possessing high amplifying characteristics may be applied to electrical circuits of practically all ratings and may be made sensitive to a wide variety of different characteristics. It eliminates any need for the standard potential reference source heretofore required in high sensitivity applications and being devoid of moving parts is exceedingly reliable in operation.

My invention itself, together with additional objects and advantages thereof will best be understood through the following description of specific embodiments, when taken in conjunction with the accompanying drawings, in which:

Figure 1 is a diagrammatic view illustrating apparatus and circuits comprised by a preferred form of the regulating system of my invention shown as being applied to maintain constant the voltage of a direct-current generator;

Fig. 2 is a partial reproduction of the system of Fig. 1, showing how the bridge controlling reactor may be made sensitive to generator output current;

Fig. 3 is a partial diagrammatic view of the system of Fig. 1 showing its application to an alternating-current generator or circuit;

Figure 4:
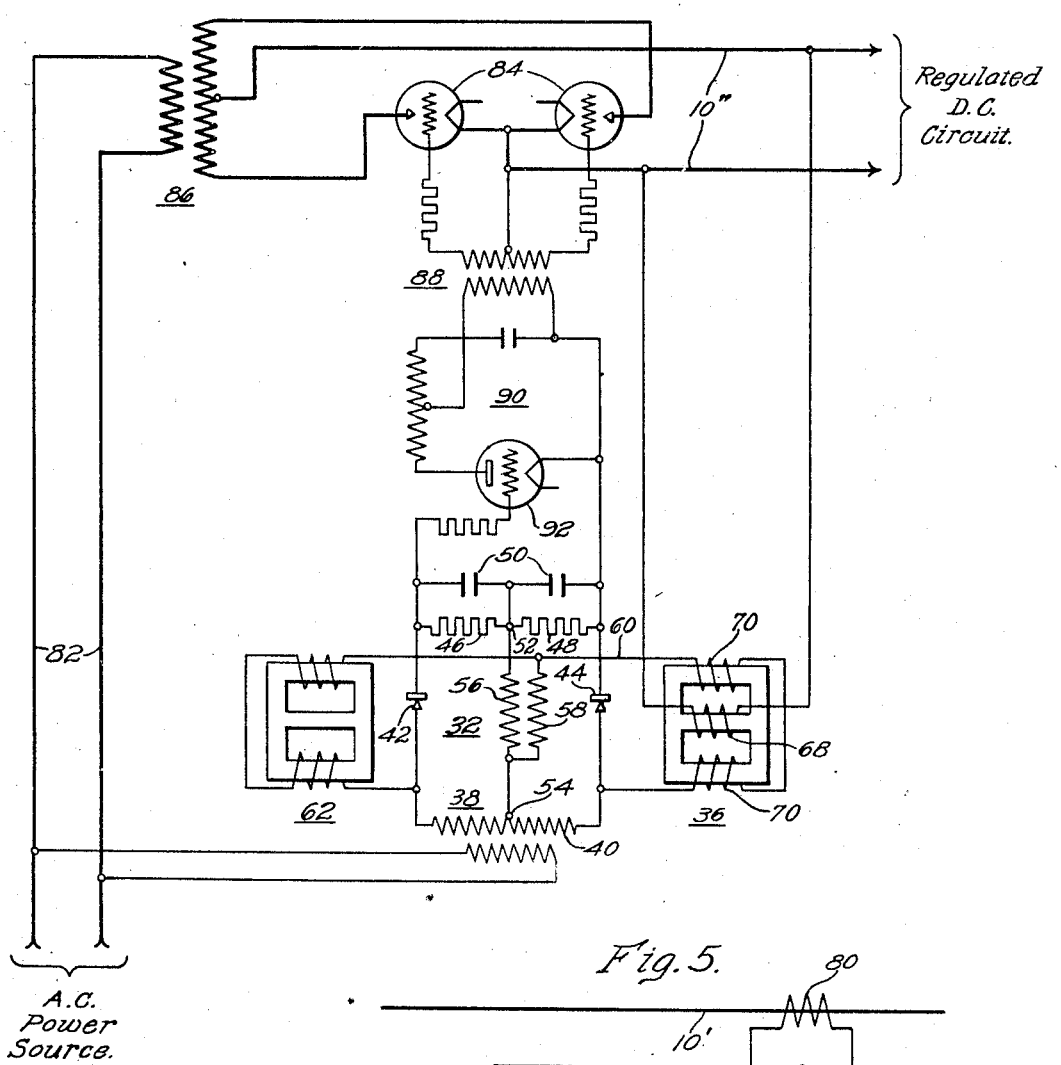
Figure 5:
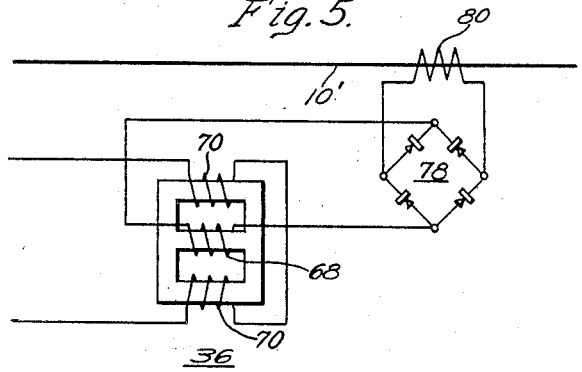

Fig. 4 is a diagrammatic representation of the regulating system of my invention adapted to control the voltage of a direct-current circuit which is supplied through rectifiers from an alternating-current source of power; and Fig. 5 is a partial reproduction of the previously illustrated systems showing how the bridge controlling reactor comprised thereby may be made responsive to the current of an alternating-current circuit.

Referring to the drawings and particularly to Fig. 1 thereof, I have there represented the improved system of my invention as being applied to maintain constant the voltage of a direct-current circuit 10 which is energized by a dynamo-electric generator 12 having an armature winding directly connected with the circuit conductors and an exciting field winding 14. This field winding is energized from any suitable source of direct current power, such as a separate exciting generator 16, through a circuit which includes one or more controllable electronic tubes 18.

These excitation adjusting tubes are represented as being of the continuous control type, the impedance to the flow of current from the anode 20 to the cathode 22 of which is determined by the magnitude and polarity of a direct-current potential impressed upon the grid 24. This potential is, in the system shown, determined by the voltage drop appearing across a resistor 26 which, in turn, is determined by the current which an error-detecting electronic tube 28 allows a battery 30 or other source of unidirectional voltage to circulate through this resistor.

Tube 28 is also of the continuous control type and derives its control voltage from the output terminals of a rectifier bridge circuit 32 which is energized from a suitable source of alternating-current power 34 and which is controlled by a saturable core reactor 36 influenced by a measure of the voltage or other characteristic of circuit 10 which it is desired to maintain constant.

In the energizing circuit for rectifier bridge circuit 32 is connected a transformer 38, the two ends of the secondary winding 40 of which are connected through rectifiers 42 and 44 with an impedance circuit comprising a pair of similar resistors 46 and 48 which are paralleled by capacitors 50. Between the common connection 52 of these resistors and a mid-tap connection 54 of the secondary winding of the transformer 38 is connected the secondary winding 56 of a second transformer, the primary winding 58 of which is energized through a circuit which includes the aforementioned mid-tap 54 and a common connection 60 between the bridge controlling reactor 36 and a second reactor 62 having a fixed value of reactance equal to that of device 36 when adjusted to an intermediate portion of its range. The outer or alternating-current windings of the two named reactors are series connected for energization by the voltage acting in the secondary winding 40 of transformer 38.

During one-half of each cycle of alternating-current voltage supplied through transformer 38, rectifier 42 passes a current which circulates through resistor 46 and during the other half of each cycle rectifier 44 similarly passes current which circulates through resistor 48, the return circuit for these two currents being through transformer winding 56 back to the mid-tap 54 of transformer winding 40. The voltage drop through the two resistors resulting from the pulsating currents charges the capacitors 50 to potentials determined by the relative magnitudes of the resistor currents. When the primary winding 58 of the return circuit transformer is unenergized, as is the case for a balanced condition of the two reactors 36 and 62, the magnitudes of these two potentials are equal and being of opposite polarity, they exactly cancel each other, thereby making zero the output voltage of the bridge, which output voltage is impressed between the grid and cathode elements 64 and 66 of electronic tube 28.

However, any adjustment in the reactance of device 36 which disturbs this balance effects an increase in the current supplied to and hence the voltage appearing across one or the other of the bridge resistors 46 or 48 which, in turn, causes to be impressed upon the grid of tube 28 a control potential of definite polarity and magnitude which is effective in adjusting the exciting current supplied through tubes 18 to machine winding 14 and hence the output voltage of machine 12.

Bridge controlling reactor 36 is of a well-known saturable core type carrying on the center core leg thereof a saturation control winding 68, the passage of a uni-directional current through which alters the impedance to a flow of alternating current through the windings 70 carried by the two outer core legs. When, as in the system of Fig. 1, the quantity sought to be maintained constant by the regulating system is a voltage (of circuit 10), this saturation control winding 68 may be directly connected with the conductors 10 of the regulated circuit.

In operation of the complete regulating system shown in Fig. 1, when the voltage of circuit 10 is of the desired value, winding 68 of reactor 36 saturates to an intermediate degree the core of this device causing the reactance offered to substantially equal that of the fixed reactance 62. For this condition, the rectifier bridge circuit 32 supplies to electronic tube 28 a grid control potential of zero or small negative value, causing this tube to circulate through resistor 26 an intermediate value of current. The resulting voltage drop impresses upon the grids of tubes 18 a potential which causes them to maintain the excitation of machine 12 at the value required to supply to circuit 10 the aforementioned desired value of voltage.

Upon a decrease in the voltage of regulated circuit 10, the saturation of the core structure of reactor 36 is lowered and the reactance of this device correspondingly raised. The resulting unbalance of the fixed reactance 62 causes the output voltage of the right-hand branch of the bridge circuit 32 to decrease and that of the left-hand bridge to increase. As a result, the potential impressed upon the grid of electronic tube 28 is changed in the negative direction, the effect of which is to lower the tube conductivity and decrease the negative grid voltage applied to excitation adjusting tubes 18. This raises the conductivity of these tubes, permitting them to pass from exciter 16 more current to machine field winding 14 and thereby correctively raise the voltage of machine 12 back to the desired value.

Upon an increase in the voltage regulated circuit 10, on the other hand, the saturation of reactor 36 is raised, its reactance lowered, and the output voltage of the right-hand branch of bridge circuit 32 caused to exceed that of the left-hand branch. The resulting change in the positive direction of the grid potential impressed upon tube 28 raises the tube's conductivity and increases the negative potential applied to the grids of tubes 18 which by decreasing the conductivity of these tubes lowers the excitation of machine 12 to correctively adjust its voltage back to the desired value.

In practice, the error detecting means of my invention just explained are found to be of utility in all voltage regulating applications, inasmuch as the rectifier bridge 32 is capable of rather high amplifying ability, and thus provides the desired high sensitivity without the use of the supplemental source of reference or standard potential heretofore required. It is of particular utility when the circuit to be regulated has a low voltage rating, since, in such case, even the use of a standard reference potential falls short of affording sensitivity of a high order. The system of my invention, on the other hand, utilizes a simple saturation control winding 68, the electrical resistance of which may be made exceedingly low and the response to small changes in a low potential thus made relatively high.

Nor is my improved system restricted to application for direct current voltage regulation. By connecting, as in Fig. 2, the saturation control winding 68 of reactor 36 in parallel with a resistor 76 connected in series with one of the main conductors of the regulated circuit 10, my improved system may be made responsive to changes in circuit current. In case it is desired that an alternating current be responded to, this may be accomplished by the connection shown in Fig. 5 which comprises a rectifier 78 interposed between the saturation control winding 68 and a current transformer 80 which responds to the current passed through the conductor 10' of an alternating current circuit. By utilizing the connections shown in Fig. 3, my improved system may likewise be made responsive to the voltage of an alternating current circuit 10' shown as being supplied by an alternating current generator 12'.

In Fig. 4, I have shown the regulating system of my invention applied to maintain constant the voltage of a direct current circuit 10" which is supplied from a source of alternating current power 82 through a pair of controllable electronic tubes 84 connected in association with a transformer 86 to afford full wave rectification. Tubes 84 are of the discontinuous control type and their effective conductivity may be varied by altering the character of the potential impressed upon the grid elements thereof by a transformer 88 which, in response to changes in the phase angle of the voltage supplied thereto by a phase-shifting bridge circuit 90 causes tube conductivity to be instituted at an earlier or a later point in each positive half cycle of tube anode voltage.

The phase-shifting bridge circuit 90 utilizes a controlling electronic tube 92, the grid circuit of which is supplied by the output of a rectifier bridge 32 which, in construction and arrangement, may be the exact equivalent of that already described in connection with the system of Fig. 1.

In operation of the complete system of Fig. 4, a decrease in the voltage of circuit 10" acts upon the reactor 36 which so controls the rectifier bridge 32 as to cause it, through tube 92 and phase-shifting bridge circuit 90, to increase the effective conductivity of the tubes 84 and thereby correctively raise the regulated circuit voltage. In a similar manner, an increase in this regulated voltage produces the opposite effect to thereby correctively lower the conductivity of the tubes 84.

Although I have shown and described certain specific embodiments of my invention, I am fully aware that many modifications thereof are possible. My invention, therefore, is not to be restricted except insofar as is necessitated by the prior art and by the scope of the appended claims.

I claim as my invention:

1. In a system for maintaining constant an electrical quantity, the combination of means, utilizing an electronic tube, for adjusting the magnitude of said quantity, a reactor having a core-saturating winding energized by a measure of said quantity, a rectifier-bridge circuit controlled by said reactor and comprising two opposing branches each of which includes a rectifier, means for energizing said branches by alternating-current potentials which are of equal magnitude when the reactor impedance is of an intermediate value and of unbalanced values when that impedance varies from said intermediate, and means for controllably impressing upon said electronic tube the sum of the opposing direct-current output voltages of said two bridge-circuit branches.

2. A regulating system for a direct-current circuit comprising, in combination, means, comprising an electronic tube, for adjusting a characteristic of said circuit, a control circuit for said tube, an error-responsive device for converting variations from a desired value in said characteristic into changes in the impedance of the device, a rectifier-bridge circuit, controlled by said device, comprising two opposing branches in each of which is disposed a rectifier, means for energizing said branches by alternating-current potentials which are of equal magnitude when the impedance of said device is of an intermediate value and of unbalanced values when the impedance of the device varies from said intermediate, and means for impressing the sum of the opposing direct-current output voltages of said two bridge-circuit branches upon the control circuit of said electronic tube.

3. In a regulating system for an electrical circuit comprising means, utilizing an electronic tube, for adjusting a characteristic of said circuit, the combination of a saturable-core reactor influenced by a measure of said characteristic, an alternating-current energized bridge circuit controlled by said reactor and comprising two opposing branches each of which includes a rectifier, a second reactor so associated with the bridge circuit that when the reactance of the reactor first named differs from that of the second reactor the bridge-circuit branch potentials will be correspondingly unbalanced, and means for controllably impressing upon said electronic tube the sum of the opposing direct-current output voltages of said two branches.

FINN H. GULLIKSEN.